United States Patent [19]

Bubik

[11] Patent Number: 4,637,623
[45] Date of Patent: Jan. 20, 1987

[54] TOWING APPARATUS
[75] Inventor: Leslie Bubik, Ontario, Canada
[73] Assignee: Vulcan Equipment Company, Ltd., Scarborough, Canada
[21] Appl. No.: 752,980
[22] Filed: Jul. 8, 1985
[51] Int. Cl.⁴ .............................................. B60P 3/12
[52] U.S. Cl. .................................. 280/402; 414/426; 414/563
[58] Field of Search ............... 280/402, 493; 414/563, 414/426, 427, 429

[56] References Cited

U.S. PATENT DOCUMENTS

| | | | |
|---|---|---|---|
| 3,182,829 | 5/1965 | Wagner | 414/563 |
| 3,434,607 | 3/1969 | Nelson | 280/402 |
| 3,830,387 | 8/1974 | Virnig | 414/429 |
| 3,897,879 | 8/1975 | Bubik | 214/86 |
| 4,034,873 | 7/1977 | Haring | 280/402 |
| 4,264,262 | 4/1981 | LoCodo | 414/563 |
| 4,473,334 | 9/1984 | Brown | 280/402 |
| 4,513,857 | 3/1986 | Portor | 280/402 |
| 4,564,207 | 1/1926 | Russ | 280/402 |

OTHER PUBLICATIONS

Publication Jerr-Dan Jerrlift #, J11085-2M, dated 1985.
Publication The Challenger Invader Series #, 6R1 12-84-4398, dated 1984.
Publication Century Metro I Wheel-Lift Combo #, CA2522-10M.
Publication The New Standard for Damage Free Towing-Century Wrecker Corp.
Publication AATAC Atlas Wheel Lift, "The New Standard of the Towing Industry".
Publication Holmes Protech, Bring Back Every Car Out There, Holmes International.
Publication-Presenting the American Wheel Lift (American Wheellift System).
Publication-An Unequaled Recovery System (American Wheellift System).
Advertisement-Damage Free Towing With a Peterson Scoop-Diversified Products, Mfg. Co.
Advertisement-Get The Best-Dover Corporation/Ernest Holmes Division.
Advertisement-Vulcan Cradle Snatcher II.
Advertisement-Tow Times-Vulcan Equipment Company.
Advestisement-Now Thats Smart-Diversified Products Mfg. Co.
Advestisement-Recovery of the Month Towing Around the World-Zacklift Co.
Advertisement-Vulcan Equipment Company, Ltd.-Vulcan Equipment Co.
Advertisement-Wheel-Lift Body Guard-E. R. Buske Mfg. Co., Inc.
Advertisement-The Original HY*Jacker by Merlin--Wreceker Supply Co.
Advertisement-The Challenger Invader Series-Challenger Wrecker Mfg., Inc.
Advertisement-Vulcan Cradle Snatcher Series III--Vulcan Equipment Company., Ltd.
Advertisement-Look Close at the Hy*Jacker by Merlin-Dealers Wrecker Supply.
Advertisement-Damage Free Towing With a Peterson Scoop-Diversified Products Mfg., Co.
Advertisement-Wheel Lift Body guard by Buske-Buske Nfg. Co., Inc.
Advertisement-The High Performance Wheel-Lift-American Wheelift Systems.
Advertisement-Wheel Lift-West Manufacturing Towing Equipment.
Advertisement-Tow Biz-Ernest Holmes Division.
Advertisement-Get The Wheel Sling Advantage Guaranteed from Ready Built Tow Trucks, Inc.-Ready Built Tow Trucks Inc.

Primary Examiner—John A. Pekar
Attorney, Agent, or Firm—Niro, Scavone, Haller & Niro

[57] ABSTRACT

A towing apparatus of the wheel lift variety is provided with wheel support members that move horizontally or vertically relative to a fixed-position support beam. The support members are mounted to the beam by pivotable, tapered collars and include a depending retainer that has both an extended height and depth to contact a substantial portion of the wheel circumference. The apparatus also provides means for rotating the support beam both above the below the horizontal. All of these features facilitate use of the towing apparatus.

14 Claims, 8 Drawing Figures

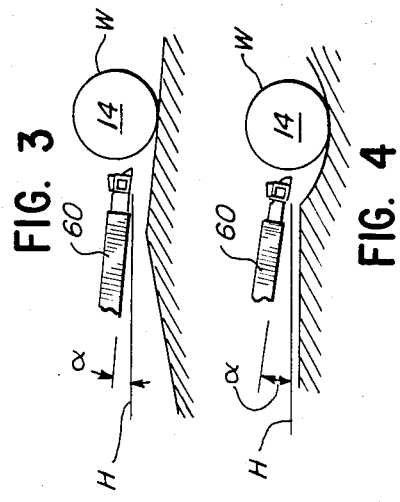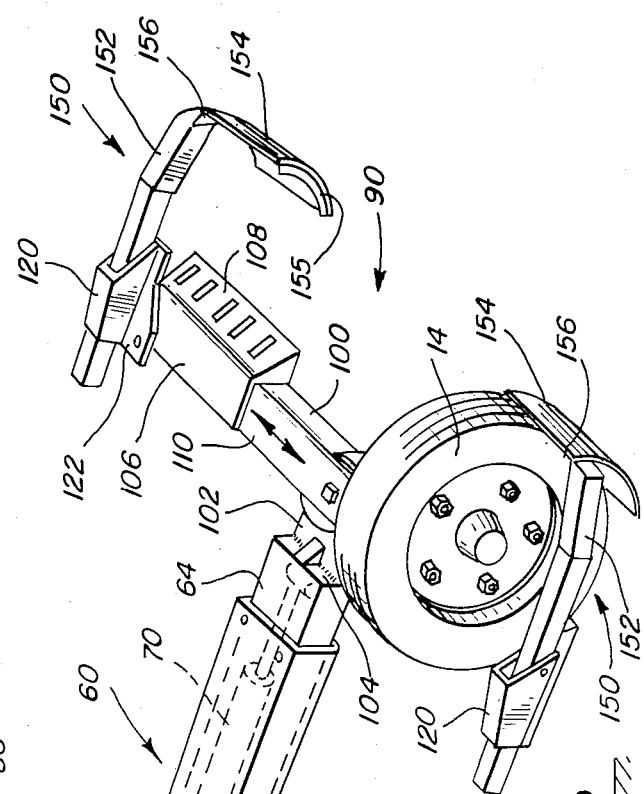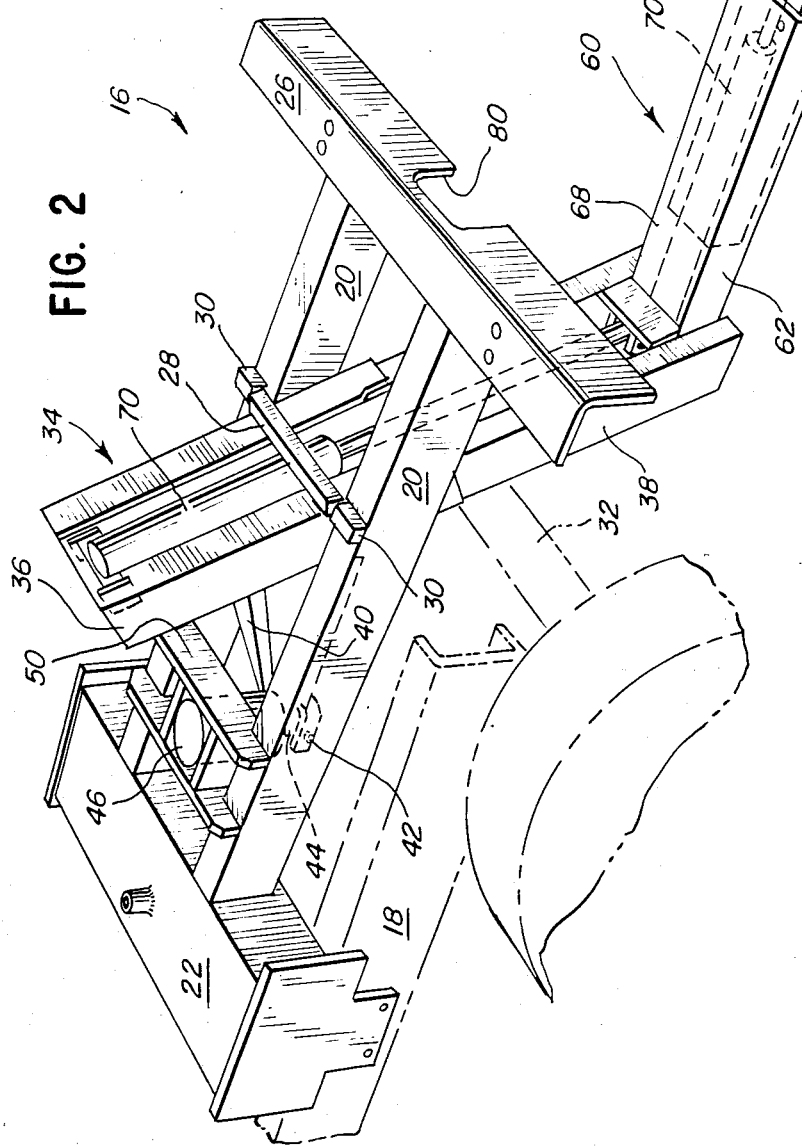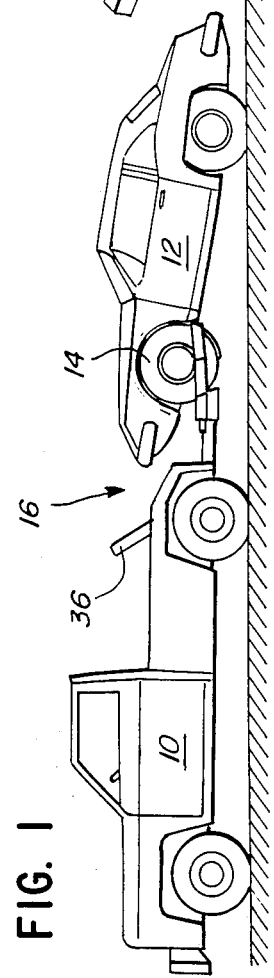

TOWING APPARATUS

BACKGROUND OF THE INVENTION

This invention is directed to an apparatus for lifting and towing vehicles. More particularly, the present invention relates to an improved lifting and towing apparatus of the "wheel-lift" variety whereby a vehicle to be towed is supported solely or substantially by its wheels.

In recent years, the design problems confronting those in the towing apparatus industry have become increasingly complex. It is essential not only to design a safe, reliable and cost-effective product, but also to accommodate the increasingly difficult constraints imposed by changes in the design of many modern automobiles. For example, current automotive design emphasizes shock-absorbing bumpers, and a variety of non-metallic or otherwise fragile parts to reduce cost and weight and save fuel. Also, present automobiles employ spoilers, low ground clearance, and small clearances between wheel wells and tires. These features also save weight and reduce drag. However, these same features also present serious difficulties when a modern automobile is disabled and must be towed. Shock-absorbing bumpers, non-metallic parts and spoilers cannot withstand the forces imposed when raising one end of an automobile by a sling attached between the automobile's axle and the boom of a tow truck. Second, the minimal ground clearance available makes engagement of the sling on the axle more difficult and time-consuming. Additional problems with conventional sling-type towing are created by modern, low-clearance parking garages which impede the use of any sling-type towing device which depends upon a boom.

Some of these disadvantages and problems are addressed by wheel-lift towing devices. These devices employ various means to lift a disabled vehicle by its wheels, rather than by the vehicle body structure. See, for example, U.S. Pat. No. 3,897,879, "Vehicle Towing Apparatus", which discloses a tow truck that employs a cradle which, in turn, supports the wheels of the disabled vehicle. The cradle is lifted by a boom attached to the ends of the cradle by slings.

Another type of device intended to overcome some of the disadvantages described above employs a parallel bar and strap system. The system has a beam which is positioned under one end of a vehicle to be towed, and in contact with the tire tread of each of the pair of wheels to be lifted. Then, L-shaped supports are attached to each end of the beam. Each support has a long portion which attaches to the beam and which spans the outside of the towed vehicle wheel. A short portion extends horizontally at a right angle from the long portion, generally parallel to the beam and to the axle of the disabled vehicle, and toward the centerline of the vehicle. The beam and short portion together form parallel members; each pair of members supports a wheel. Each wheel is then strapped to some part of its support to prevent the wheel from rolling out of its support when the towing and towed vehicles accelerate or decelerate. The beam is attached to the towing vehicle by means which allow the beam (and thus one end of the towed vehicle) to be raised and, in some cases, moved closer to the towing vehicle. It is important to decrease this distance, because the weight of the towed vehicle creates a moment about the rear wheels of the towing vehicle. The moment, if large enough, reduces the weight on the front wheels of the towing vehicle and can even lift the wheels. This in turn impedes steering or renders it impossible. It similarly affects braking. Countering this lifting effect requires that weight be added to the towing vehicle forward of its rear wheels, thus adding expense and depressing fuel economy. Shortening the lever arm mitigates this effect.

Currently available wheel-lift towing devices suffer from additional disadvantages. First, the straps can be time-consuming and difficult to use, especially in cold, wet, or other inclement weather conditions. Second, the contact between the parallel members and the wheel is sometimes unsatisfactory because the members contact only a small portion of the tire tread. In fact, some devices only make contact along a line because the L-shaped support is often made of square tubing or pipe. If the tire deflates after the vehicle is lifted, the wheel can drop between the parallel members. On the other hand, if the parallel members are brought closer together to eliminate this danger, the force necessary to roll the wheel out of the support is reduced. Separation of the towed and towing vehicles could occur more easily, causing a serious accident. In either case, the towing apparatus may fail in service.

The close spacing of the parallel members leads to another disadvantage. As the gap between the members decreases, parallel members must engage the lifted wheel farther below the center of the wheel, and well below the lower body line of the vehicle; i.e., an imaginary straight line extending along the vehicle side at the height of the lowest points on the vehicle body. As the distance between this lower body line and the highest point of contact with the lifted wheel increases, the tendency of the vehicle to roll out of the support in the event of acceleration or deceleration is increased.

Fourth, presently available wheel-lift devices generally place the beam and supports on, or very close to the ground before they are connected. Thus, the long portion of the support spanning the outside of the wheel requires several inches clearance. If the outside of the wheel, or any part of it, is in contact with or immediately adjacent to a curb or other obstruction, the wheel-lift device is even more difficult to use or possibly rendered useless.

Fifth, some of the present wheel-lift devices generally require that the centerline of the towing vehicle be colinear, or very nearly so, with the centerline of the towed vehicle.

Sixth, present wheel-lift devices generally require that the wheels of the vehicle to be lifted be turned straight, or very nearly so. If the wheels are turned, the distance between parallel members may be too great to provide adequate contact with both sides of the wheel.

Seventh, many present wheel-lift devices are severely hampered or rendered useless by uneven road surfaces, parking garage ramps, potholes, depressions, etc. Devices that can adapt to these situations do so in a mechanically undesirable manner which, among other things, places too much weight behind the rear axle of the towing vehicle.

Eighth, in order to lift the towed vehicle, some currently available wheel-lift devices tilt the wheel supports, so that the plane of the parallel members is not horizontal. The front parallel member supporting the lifted wheel may be at a lower height than the rear parallel member. This aggravates the tendency of the towed vehicle to roll out toward the towing vehicle.

Even if the vehicle does not roll out, the vehicle body may be damaged because the rear parallel member is bulky in comparison to the small wheel-to-wheel well clearance in modern automobiles. It is especially desirable that any towing device not damage the body of the towed vehicle.

SUMMARY OF THE INVENTION

The present invention preserves the advantages of wheel-lift towing devices over sling towing devices. In addition, it provides new advantages not found in currently available wheel-life devices, and overcomes many of the disadvantages of currently available devices.

The invention is generally directed to a vehicle towing apparatus that employs a wheel-lift vehicle support system including unique structural features to facilitate the use of such towing apparatus in circumstances and under a wide variety of conditions previously unattained by wheel-lift towing devices. The invention also addresses the need to position the towing apparatus in a favorable location on the towing vehicle, with various components arranged either directly above or forward of the vehicle's rear axle. Moreover, the unqiue arrangement of structural features comprising the invention also reduces the cost of manufacture as compared to many currently available wheel-lift tow trucks.

In one preferred embodiment, the towing apparatus of the present invention includes a frame, a column pivotally mounted to the frame, a generally horizontal boom extending rearwardly from the column, a transverse support beam mounted to the rear end of the boom, means associated with the beam for supporting a vehicle, and means for pivoting the column relative to the frame to reposition the boom in different angular orientations. The apparatus also includes power-operated means for raising or lowering the column and for extending or retracting the boom to perform the various vehicle lifting and towing operations.

In accordance with this preferred embodiment of the invention, the column is pivoted by means operatively associated with both the frame and the column and located at a point generally forward of the rear axle of the towing vehicle. This, of course, tends to reduce the undesirable moment arm created by the towing apparatus and towed vehicle behind the rear axle which, in turn, reduces the tendency to lift the front wheels of the towing vehicle while in operation.

A further feature of this embodiment is the positioning of the pivoting means generally below or at a co-equal height with the frame of the towing apparatus and the rear deck of the towing vehicle.

In another preferred embodiment of the invention, uniquely constructed wheel support members provide additional advantages. In accordance with this embodiment, the towing apparatus includes a transverse support beam, two wheel support members mounted at opposing ends of the beam, and means for rotating the wheel support members in a generally horizontal plane relative to the beam. In preferred form, the mounting means comprises two tapered collars, one pivotally mounted to each end of the beam and adapted to removably and slidingly engage the wheel support member. The tapered construction further provides for rotation of the wheel support members in a generally vertical plane relative to the beam.

In a still further preferred form of the invention, the towing apparatus includes a transverse support beam and two specifically configured wheel support members, each slidably engageable with opposing ends of the beam and positioned above the beam. In accordance with this embodiment, each wheel support member is an elongated arm with a wheel retainer, in the form of a curved plate, depending from one end of the arm. The arm, itself, may also include an offset to accommodate various wheel designs with laterally extending obstructions.

In another embodiment, the invention includes a telescoping column rotatably mounted on the towing vehicle. An inner member of the column may be extended downwardly and outwardly from the rear of the towing vehicle. A rearwardly telescoping boom is attached to the lower end of the column, and includes a distal portion which may be extended further from the rear of the vehicle. A transverse support beam, attached to the boom, has sliding shoes at its outer ends which may be fixed at various transverse intervals to match the length of the transverse beam to the approximate width of the towed vehicle. Wheel supports are inserted in pivotable tapering collars on each end of the support beam. Each wheel support includes a bowed or offset arm extending rearwardly to span the outside of a wheel on the vehicle to be towed. A wheel retainer is disposed on the end of each wheel support, in the form of a depending plate which is preferably curved, the concave surface of which contacts the tire tread of the wheel to be lifted. The wheel is also supported by a sloping rear surface of the transverse beam in contact with the tire tread.

Column rotation accomplishes one object of the invention by permitting the end of the boom, the beam and wheel supports to be moved through an arc extending both above and below the surface upon which the towing vehicle rests, thus allowing these components to be placed on surfaces from or at an angle to the towing vehicle surface. Column rotation also assists in the lifting function and helps to position the boom close to the ground, so it will easily fit under the body of the towed vehicle.

The column rotation and telescopic action of the column and boom accomplish another object of the invention, which is to reduce as much as possible the distance between the towed vehicle and the rear wheels of the towing vehicle, and move the weight of the column as far forward of the rear wheels as is possible.

The pivoting and tapering collars accomplish further objects of the invention, namely, to facilitate positioning of the wheel support members and to permit their angular displacement to accommodate varying towing environments.

The mounting of the collars on top of the support beam accomplishes another object of the invention, which is to allow proper positioning of the wheel support members even with the wheels of the towed vehicle in contact with, or immediately adjacent to, a curb or other obstacle.

The depending and elongated surfaces of the wheel retainers and transverse beam accomplish another object of the invention by supporting the tire over a large area of its tread, including a portion above the lower body line of the towed vehicle, thus preventing a deflated tire from dropping through the wheel support while at the same time minimizing the possibility that a fully inflated wheel might roll up and out of the wheel support without necessitating the use of straps or other auxiliary wheel retention devices.

BRIEF DESCRIPTION OF THE DRAWINGS

The novel features of the invention are set forth in the appended claims. The invention itself, however, together with further objects and attendant advantages thereof, will be best understood by reference to the following description taken in connection with the accompanying drawings in which:

FIG. 1 is a side view showing the present invention, mounted on a vehicle, towing a disabled automobile.

FIG. 2 is a perspective view of the invention mounted on a truck (shown in partial phantom) and shown supporting one wheel of a towed vehicle, the remainder of which is not shown.

FIGS. 3 and 4 are partial side views of the extendable boom showing the boom rotated into alternate positions to accommodate uneven surfaces.

DESCRIPTION OF THE PREFERRED EMBODIMENTS

Figure 5:
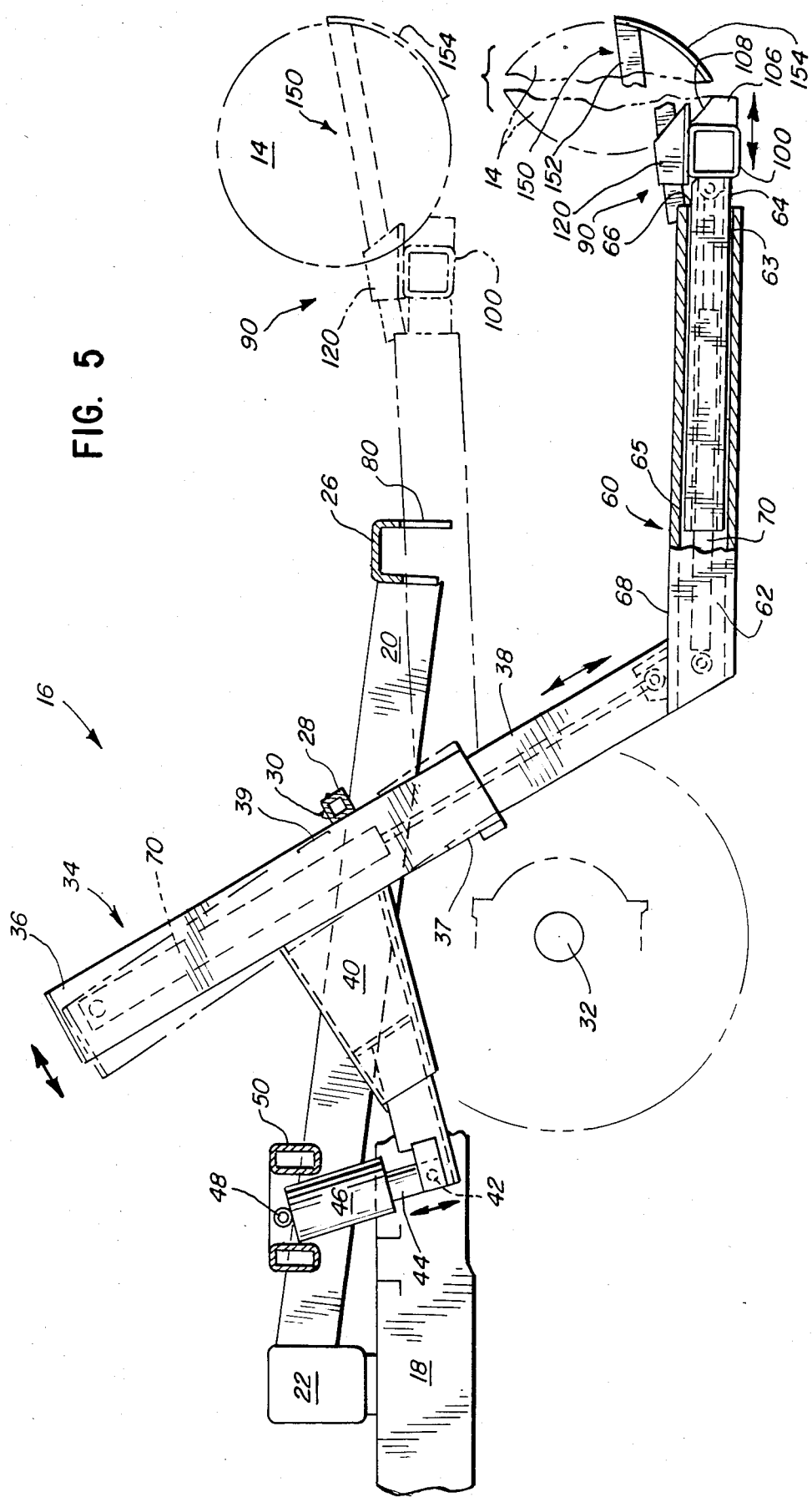
FIG. 5 is a side view of the invention showing in phantom the column rotated forward, the inner column member raised, and the boom retracted for traveling while towing a vehicle, one wheel of which is also shown in phantom. The extendable boom is partially broken away to show the boom hydraulic actuator.

The present invention may be mounted on any suitable vehicle. FIG. 1 shows a truck 10 towing a vehicle 12 by supporting the wheels 14 of the towed vehicle 12. Though not shown, the towing apparatus may alternatively suppport the rear wheels of the vehicle 12.

FIG. 2 shows towing apparatus 16 mounted on a truck chassis 18 shown in phantom. Two elongated supports 20 are each attached at one end to a front support 22 which is transverse to the centerline of chassis 18 and permanently anchored at each end to chassis 18. The opposite end of each elongated support 20 is affixed to a rear support 26, also transverse to the centerline of chassis 18 and permanently attached to chassis 18. Thus, supports 22 and 26, and elongated supports 20 form a rectangular frame, the long axis of which is in the same plane as the centerline of chassis 18.

An axle 28 is rotatably secured at each end in a socket 30, attached to an upper surface of one of elongated supports 20. Axle 28 is parallel to a rear vehicle axle 32 of chassis 18. A column 34 has a hollow outer member 36 which is attached to and rotates with axle 28. An inner member 38 is slidably enclosed within outer member 36 and extends downwardly from the lower open end of outer member 36. The ability of column 34 to pivot and telescope provides important advantages to the present invention. First, pivoting of column 34 allows the wheel support structure described below to be moved to accommodate surfaces displaced from or at an angle to the surface on which truck 10 rests. Second, the telescoping action of column 34 raises the towed vehicle 12. Third, the pivoting and telescoping motions of column 34 cooperate to place the wheel support structure in as nearly a horizontal plane as possible when vehicle 12 is lifted. This in turn reduces the tendency of vehicle 12 to roll out. Finally, the pivoting motion of column 34 helps to keep the weight of column 34 forward of the rear vehicle axle 32, reducing the undesirable moment arm created by towing apparatus 16.

It will be apparent to those skilled in the art that there are a variety of means by which pivoting of column 34 may be controlled. One means for pivoting column 34 is depicted in FIG. 5, and includes a lever arm 40 extending from the forward, lower surface of outer member 36. An end of arm 40 away from member 36 is pivotally attached by pin 42 to a piston 44 of a first hydraulic actuator 46. Actuator 46 is in turn pivotally attached by pin 48 to box 50 mounted between elongated supports 20. The arc through which column 34 rotates is determined by the stroke of arm 44 and the distance from pin 40 to axle 28. In the preferred embodiment, this arc is approximately 12° to 18°. The size of actuator 46, stroke of piston 44, and length of arm 40 are calculated to provide the necessary rotation of column 34 while avoiding interference with the towing vehicle's driveshaft, which is not shown.

Returning to FIG. 2, wheel support structure 90, described below, is positioned and supported by boom 60, which is rigidly attached to the lower end of inner member 38. Boom 60 has a hollow outer boom member 62 slidably enclosing an inner boom member 64. Inner boom member 64 extends through an open end 66 of outer boom member 62. Movement of inner boom member 62 thus increases or decreases the length of boom 60. The upper surface 68 of outer boom member 62 forms an obtuse angle with the rear top surface of inner column member 38. The long axes of column 34 and boom 60 both lie in a plane which is perpendicular to axle 28 and which includes the centerline of chassis 18. The telescoping movement of boom 60 accomplishes two purposes. First, it allows the wheel support structure 90 to be extended under towed vehicle 14 in contact with wheels 12. After the towed vehicle is engaged, retracting boom 60 moves toward vehicle 14 closer to truck 10. This in turn reduces the moment created by towing apparatus 16 about the rear axle 32 of truck 10. When raised, as shown in phantom in FIG. 5, boom 60 fits into notch 80 in rear support 26.

Telescoping of column 34 and boom 60 may be accomplished by a variety of means apparent to those skilled in the art. FIG. 5 shows hydraulic actuators 70 operatively associated with outer and inner members 36 and 38, and with outer and inner boom members 62 and 64, respectively. Friction due to telescoping is minimized by pads located between outer and inner members 36, 38, 62 and 64. Outer member 36 has a pad 37 at its lower end on the inside surface; pad 37 is coated with a low-friction material. Pad 37 supports and prevents binding of inner member 38 against outer member 36. Inner member 38 has a similar pad 39 at its upper end. Pad 39 prevents binding of the upper end of inner member 38. Boom members 62 and 64 are provided with pads 63 and 65 which accomplish the same friction-reducing and support functions as pads 37 and 39.

The top of column 34 may be equipped with sheaves, not shown, for use with a power-operated winch mounted elsewhere on truck 10.

Figure 7:
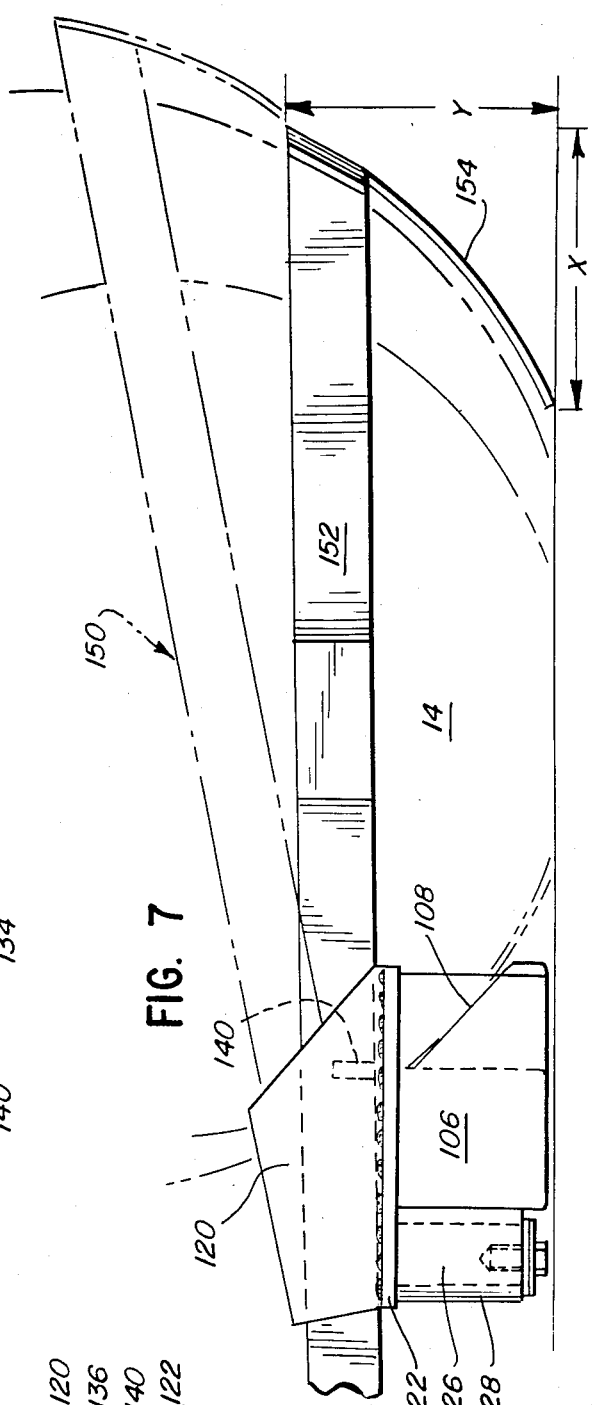
FIG. 7 is a partial elevation view of the invention shown in FIG. 6 and showing alternative positions of the wheel support arm holding a towed vehicle wheel.

Wheel support structure 90 is shown in FIGS. 2 and 7 and is comprised generally of a transverse beam 100, collars 120 and wheel supports 150. Transverse beam 100 is pivotally attached to a flange 102 extending from an end 104 of inner column member 64. Transverse beam 100 pivots about an axis lying in the plane containing the long axes of column 34 and boom 60, through an arc extending to either side of a line coincident with the extended axis of boom 60. Transverse beam 100 may be locked in a desired position with respect to boom 60 by any of a variety of means known in the art and now shown here. The ability to pivot transverse beam 100 with respect to boom 60 insures that towed vehicle 12 has a turning radius equal to or smaller than that of truck 10. Consequently, towed vehicle 12 trails properly and there is no danger that a sharp turn by truck 10 will cause vehicle 12 to be forcibly dislodged from wheel support structure 90. Pivoting of transverse beam 100 also allows towing apparatus 16 to be used even though truck 10 is at an angle to vehicle 12. Transverse beam 100 also is extended or retracted with the telescoping of boom 60. A shoe 106 is slidably mounted on each end of transverse beam 100. Each shoe 106 may be manually moved and locked by means not shown at intervals along the long axis of transverse beam 100. By positioning shoes 106 at different distances from the pivotal attachment of transverse beam 100 to boom 60, the length of transverse beam 100 is adjusted to suit towed vehicles of different track widths. Thus, the invention may be used with vehicles of different sizes and manufacture.

Another advantage of the present invention is contact with a significant portion of the tire tread of wheels 14. This object is partially achieved by a sloping surface 108 on each shoe 106. Each surface 108 is rectangular and attached to the side of the shoe 106 away from boom 60. The top edge of surface 108 is nearer transverse beam 100 than is the bottom edge so that the surface slopes downwardly and away from an upper surface 110 of cross beam 100.

Figure 6:
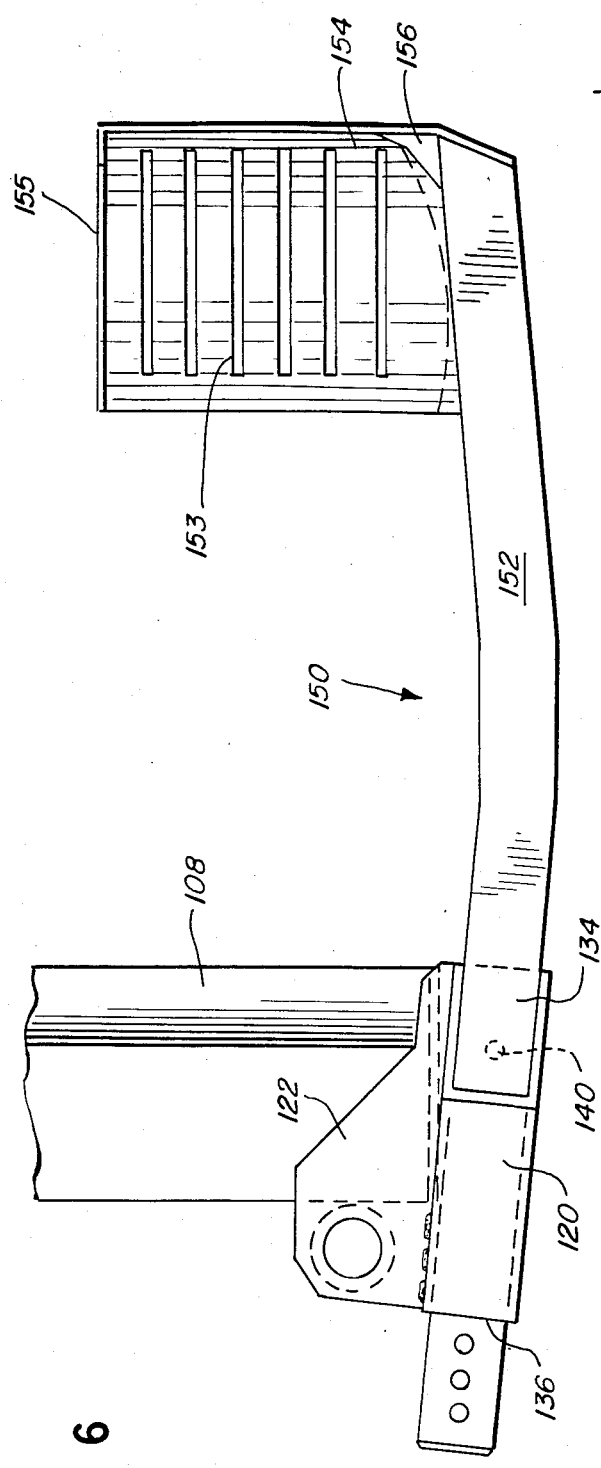
FIG. 6 is a partial plan view of the invention showing a portion of the transverse support beam, one tapered collar, and one of the wheel support arms.
Figure 8:
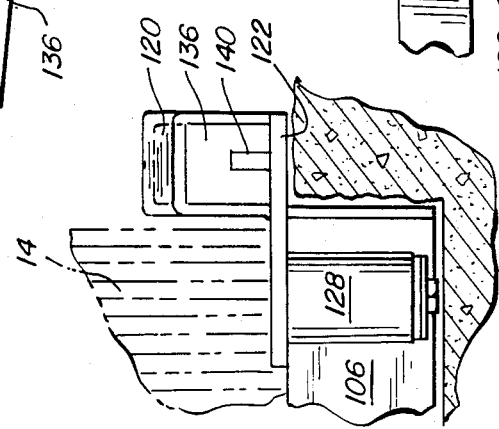
FIG. 8 is a partial elevation view taken along line 8—8 of FIG. 6 and showing the invention supporting a wheel of a towed vehicle parked against a curb.

Refer now to FIGS. 6, 7, and 8. Each shoe 106 supports a tapering collar 120 pivotally attached to its upper surface. Pivoting of collars 120 accomplishes an important object of the invention by allowing wheel support arms 150 to be independently rotated through a horizontal plane. Collars 120 pivot independently because a vehicle to be towed may have been damaged, resulting in each wheel being turned in a different direction. This could occur, for example, if the steering linkage of the vehicle was broken, or if an axle or wheel was bent. Rotation through an arc of 360° is permitted by mounting each collar on a base plate 122. Each base plate 122 has a cylindrical pivot 126 depending from its lower surface. Each pivot is rotatably retained within a tube 128 fixed to the side of shoe 106 away from sloping surface 108. Any one of a variety of means readily apparent to those skilled in the art may be used to control rotation of collar 120.

The tapering shape of each collar 120 is also significant, because it permits limited movement or rotation of the wheel support arms 150 in the generally vertical direction. Each collar 120 has a rectangular cross section in a plane perpendicular to the plane containing wheel 14. Collar 120 has a mouth 134 at one end to receive an arm 152 of wheel support 150, and an opposite open end 136 through which arm 152 extends. Mouth 134 is rectangular; open end 136 is similar but smaller. Open end 136 is slightly larger than arm 152, which is also rectangular in cross-section. The cross section of collar 120 continuously tapers from mouth 134 to open end 136. A locking pin 140 protrudes upwardly inside collar 120; pin 140 is located near mouth 134. Thus, as shown in FIG. 7, when arm 152 of wheel support 150 is inserted through collar 120, wheel support 150 can tilt or rotate vertically in an arc centered on the bottom edge of open end 136 and lying in a plane of wheel 14. The tilting of arm 152 permits wheel support arm 150 to be engaged even if wheel 14 rests on a surface which is displaced from, or angled with respect to, the surface upon which vehicle 12 rests. The vertical movement of wheel support 150 therefore combines with the vertical movement of boom 60 and rotation of column 34 to accomplish this object of the invention. The ability to lift wheel support 150 is also useful if there is an obstacle next to wheel 14. Also, tilting of arm 152 allows arm 152 to be moved inside collar 120 without interference between pin 140, the purpose of which is described below.

As best shown in FIG. 6, arm 152 is offset or bowed. The concave sides of both arms 152 face each other, and assist in avoiding interference between the arms 152 and hubcaps or other projections on the outer surfaces of wheels 14. At an end of each arm 152 away from collar 120, a wheel retainer 154 is mounted on the concave side of arm 152. Each retainer 154 is a curved plate forming a segment of a cylinder, the axis of which lies substantially at a right angle to the long axis of the arm 152 to which wheel retainer 154 is attached, and lying above arm 152. The concave surface of wheel retainer 154 faces sloping surface 108 on shoe 106. Wheel 14 is supported between sloping surface 108 and wheel retainer 154. The large surface area of retainer 154 provides broad contact with the tire tread of wheel 14. The surface of wheel retainer 152 has ribs 153 in the plane of wheel 14 to increase friction between retainer 152 and wheel 14. Wheel retainer 154 also has a lip 155 on its edge away from arm 152. Ribs 153 and lip 155 prevent wheel 14 from slipping sideways off of wheel retainer 152. Arm 152 prevents wheel 14 from slipping off wheel retainer 154 in the opposite direction. Because wheel retainer 152 is a thin, curved structure, it fits readily into the narrow space provided between wheel 14 and the surrounding wheel well of vehicle 12. Damage to the body of vehicle 12 is thus avoided.

A gusset 156 between arm 152 and wheel retainer 154 strengthens wheel support 150 and serves an additional purpose. In case of a sudden stop when towing, towed vehicle 12 tends to roll forward out of its support. Gussett 156 inhibits this tendency because the tire tread of wheel 14 is resting against the edge of gusset 156. Hence, friction between the narrow edge of gusset 156 and the tread of wheel 14 gives rise to a moment acting opposite to the moment tending to roll wheel 14 out.

The shape and dimensions of wheel retainer 154 also give rise to major advantages of the invention. As shown in FIG. 7, the horizontal depth of wheel retainer 154 is represented by "x". The height of wheel retainer 154 is represented by "y". As x and y increase, the towing stability of the invention is improved compared to other wheel-lift devices. As can be seen in FIGS. 1 and 5, an increase in y causes the top of retainer 154 to be much closer to the center of wheel 14 and to extend above the lower body line of the vehicle 12. The broad contact in the vertical direction substantially reduces the ability of the towed vehicle to roll out. An increase in y also eliminates the need for straps employed by other wheel-lift devices. The vertical dimension of shoe 106, while not as great, is also helpful in this regard. Similarly, an increase in x reduces the gap between retainer 154 and shoe 106. Therefore, the possibility that a damaged, turned, or deflated tire could drop between shoe 106 and retainer 154 is lessened. In the preferred embodiment, the vertical dimension between the top and bottom of wheel retainer 154 is seven and one-half inches. The horizontal dimension from the front edge of retainer 154 to its rear edge is from four to five inches. Thus, wheel 14 is supported in both vertical and horizontal directions by broad planar contact, instead of the point-to-point or linear contact of the prior art.

Engagement of the towing device with the wheels of a vehicle 12 occurs as follows. Referring first to FIG. 7, shoes 106 are adjusted to crossbeam 100, which is then moved so that each sloping surface 108 is in contact with one of a pair of wheels 14. Note that, as shown in FIG. 8, wheel 14 may abut a curb 160 or similar obstacle extending as much as four inches or more above the bottom of the tire. Each wheel support 150 is next inserted into its collar 120, and rotated about pivot 126 to bring wheel support 150 adjacent to the outer surface of wheel 14. Base plate 122 is then locked to shoe 106 by any conventional means not shown. While maintaining the wheel support 150 in its tilted position (as shown in phantom), support 150 is moved to bring wheel retainer 154 into contact with the tread of tire 14. Support 150 is then lowered, engaging pin 140 with one of a plurality of holes 142 spaced at regular intervals on the bottom surface of arm 152. Pin 140 is engaged with whichever of the plurality of holes 142 provides a snug fit of wheel retainer 154 with wheel 14. As boom 60 is raised, support of wheel 14 is transferred from the surface upon which it rests to surface 108 and wheel retainer 154. The weight of wheel 14 upon wheel retainer 154 creates a moment acting about the bottom edge of mouth 134 of collar 120, thus urging the upper surface of wheel support arm 152 against the upper edge of open end 136 of collar 120. Because the cross section of open end 136 is only slightly larger than the cross section of arm 152, contact between the upper edge of open end 136 and the upper surface of arm 152 prevents disengagement of pin 140 from hole 142. In the event that towed vehicle 12 bounces, thus temporarily removing the load on wheel supports 150, disengagement of supports 150 from collars 120 is prevented by a pin 158 placed vertically through one of a plurality of holes 160 in the portion of arm 152 which projects from open end 136 of collar 120. Boom 60 and column 34 are then retracted, as shown in FIG. 5, moving the towed vehicle forward and up into the towing position, as shown in phantom.

FIGS. 3 and 4 show the tilting of boom 60 through an arc for lifting wheels 14 on different types of angled, displaced, or irregular surfaces. Furthermore, tilting of boom 60 also minimizes the distance between the surface and boom 60, which is important in light of the low ground clearance of many modern vehicles.

The ability to move wheel supports 150 in the vertical direction is also advantageous when a towed vehicle is lowered. When wheel 14 is supported on surface 108 and retainer 154, the weight of vehicle 12 tends to force wheel 14 into the gap between the supporting surfaces. However, when the vehicle is lowered and its weight transferred from towing apparatus 16 back to the ground, slight additional lowering by rotating or extending column 34 tends to lift wheel 14 and rotate wheel support 154 in the vertical direction. This action frees wheel support 154 from wheel 14, and eliminates any forces tending to bind wheel support 154 against wheel 14 or, possibly, pin 142. The towing apparatus is then easily disengaged by unlocking and rotating collars 120, by manually lifting wheel supports 154 clear of pins 142 and withdrawing supports 54 from collars 120. Boom 60 may then be retracted and raised.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. An apparatus for use in lifting and towing a vehicle, comprising:
    a support beam positionable below said vehicle;
    two wheel support members, each having an elongated arm and a wheel retainer; and
    means for mounting said wheel support members to opposing end portions of said support beam such that said arms in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle.

2. The apparatus of claim 1 wherein said mounting means also permits vertical movement of said wheel support members.

3. The apparatus of claim 1 wherein said elongated arm of each said wheel support member includes an offset portion to provide clearance around the outer sides of said pair of wheels.

4. The apparatus of claim 1 wherein the arm of each said wheel support member is disposed above said support beam to thereby locate said arms in said vehicle lifting position spaced from the surface supporting said vehicle.

5. The apparatus of claim 4 wherein said wheel retainers comprise elongated curved plates that depend from said arms of said wheel support members.

6. The apparatus of claim 1 wherein each said wheel support member may be rotated independently of the other.

7. The apparatus of claim 1 wherein said mounting means includes two elongated collars pivotally connected to the opposing end portions of the support beam, each collar tapering from the forward end to the rear end and wherein said arms of said wheel support members are slidably engageable and vertically movable within said collars.

8. An apparatus for use in lifting and towing a vehicle, comprising:
    a support beam;
    two wheel support members, each having an elongated arm and a wheel retainer;
    means for mounting said wheel support members to opposing end portions of said support beam such that said arms are in a generally horizontal orientation and for rotating said wheel support members generally horizontally from a laterally remote position spaced outwardly from the sides of the vehicle to a vehicle lifting position immediately adjacent to the outer sides of a pair of wheels on said vehicle; and
    means for permitting vertical movement of said wheel support members to facilitate location of said wheel support members in said vehicle lifting position.

9. An apparatus for use in lifting and towing a vehicle, comprising:
- a support beam;
- two wheel support members; and
- two generally horizontally disposed collars each connected to an opposing end portion of said beam, said collars having passages increasing in vertical dimension from a forward end to an enlarged rear end; said wheel support members being mounted within said collar passages in generally horizontal orientation and configured to slide and move vertically within said collar passages.

10. The apparatus of claim 9 wherein each of said wheel support members includes an elongated arm having a wheel retainer mounted at one end and the other end adapted for receipt within one of the collar passages, whereby said arms slidably engage said collars to adjust the position of said wheel retainers relative to said beam.

11. The apparatus of claim 10 further including means for locking said wheel support members within said collars to thereby maintain the position of the wheel retainers relative to said beam.

12. The apparatus of claim 11 wherein said locking means includes a pin associated with each said collar and a plurality of apertures in the arms of each wheel support member, said apertures adapted to receive said pins to thereby prevent longitudinal movement of the arms within said collars.

13. The apparatus of claim 12 wherein said pin is affixed to said collar and protrudes upwardly into said collar passage, and said apertures are located in the bottom walls of said arms.

14. An apparatus for use in lifting and towing a vehicle, comprising:
- a support beam positionable below the vehicle and having end portions which extend outside an opposed pair of wheels on said vehicle;
- two wheel support members, each including an arm and a wheel retainer;
- two collars, each pivotally connected to one of the end portions of said beam and adapted to receive one of the arms of said wheel support members to thereby mount said wheel support members to said beam and permit rotation of said wheel support members;
- each of said collars including a passage increasing in vertical dimension from front to back to permit vertical movement of said wheel support members; and
- means for locking said wheel support members within said collars.

* * * * *

UNITED STATES PATENT AND TRADEMARK OFFICE
CERTIFICATE OF CORRECTION

PATENT NO. : 4,637,623

DATED : January 20, 1987

INVENTOR(S) : Leslie Bubik

It is certified that error appears in the above—identified patent and that said Letters Patent is hereby corrected as shown below:

In claim 1, line 8, after the word "arms" insert -- are --

Signed and Sealed this

Twenty-second Day of September, 1987

Attest:

DONALD J. QUIGG

*Attesting Officer*     *Commissioner of Patents and Trademarks*

REEXAMINATION CERTIFICATE (2810th)

United States Patent [19]

Bubik

[11] B1 4,637,623
[45] Certificate Issued  Mar. 12, 1996

[54] TOWING APPARATUS

[75] Inventor: Leslie Bubik, Ontario, Canada

[73] Assignee: Vulcan International, Inc., Jackson, Miss.

Reexamination Request:
No. 90/003,709, Feb. 1, 1995

Reexamination Certificate for:
Patent No.: 4,637,623
Issued: Jan. 20, 1987
Appl. No.: 752,980
Filed: Jul. 8, 1985

Certificate of Correction issued Sep. 22, 1987.

[51] Int. Cl.$^6$ .................................................. B60P 3/12
[52] U.S. Cl. ......................... 280/402; 414/426; 414/563

[56] References Cited

U.S. PATENT DOCUMENTS

| | | | |
|---|---|---|---|
| 3,182,829 | 5/1965 | Wagner | 414/563 |
| 3,285,443 | 11/1966 | Gaumont | |
| 3,434,607 | 3/1969 | Nelson | 280/402 |
| 3,830,387 | 9/1974 | Virnig | 414/429 |
| 3,897,879 | 8/1975 | Bubik | 214/86 |
| 4,034,873 | 7/1977 | Haring | 280/402 |
| 4,264,262 | 4/1981 | LoCodo | 414/563 |
| 4,473,334 | 9/1984 | Brown | 280/402 X |
| 4,564,207 | 1/1986 | Russ et al. | 280/402 |
| 4,573,857 | 3/1988 | Porter, Sr. et al. | 280/402 X |
| 4,637,623 | 1/1987 | Bubik | |
| 4,679,978 | 7/1987 | Homes et al. | |

FOREIGN PATENT DOCUMENTS 5651647  9/1979  Japan .

*Primary Examiner*—Kevin T. Hurley

[57] ABSTRACT

A towing apparatus of the wheel lift variety is provided with wheel support members that move horizontally or vertically relative to a fixed-position support beam. The support members are mounted to the beam by pivotable, tapered collars and include a depending retainer that has both an extended height and depth to contact a substantial portion of the wheel circumference. The apparatus also provides means for rotating the support beam both above the below the horizontal. All of these features facilitate use of the towing apparatus.

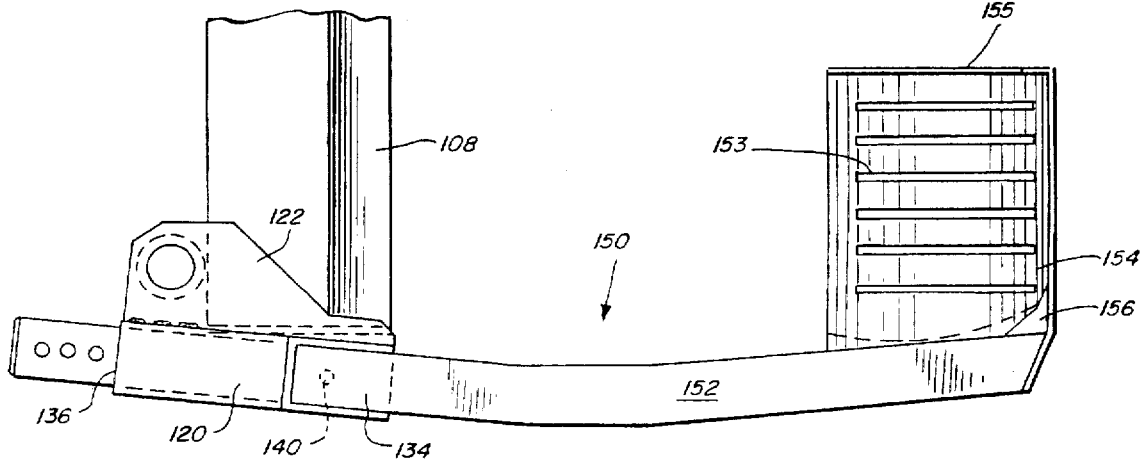

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 9–14 is confirmed.

Claims 1–4, 7 and 8 are determined to be patentable as amended.

Claims 5 and 6, dependent on an amended claim, are determined to be patentable.

New claims 15–22 are added and determined to be patentable.

1. An apparatus for use in lifting and towing a vehicle, comprising:

a support beam positionable below said vehicle;

two wheel support members, each having an elongated arm and a wheel retainer; and means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle, *said mounting means also permitting forward and rearward adjustment of said wheel support members relative to said support beam.*

2. [The apparatus of claim 1] *An apparatus for use in lifting and towing a vehicle, comprising:*

*a support beam positionable below said vehicle;*

*two wheel support members, each having an elongated arm and a wheel retainer; and*

*means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle,* wherein said mounting means also permits vertical movement of said wheel support members.

3. [The apparatus of claim 1] *An apparatus for use in lifting and towing a vehicle, comprising:*

*a support beam positionable below said vehicle; two wheel support members, each having an elongated arm and a wheel retainer; and*

*means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle,* wherein said elongated arm of each said wheel support member includes an offset portion to provide clearance around the outer sides of said pair of wheels.

4. [The apparatus of claim 1] *An apparatus for use in lifting and towing a vehicle, comprising:*

*a support beam positionable below said vehicle; two wheel support members, each having an elongated arm and a wheel retainer; and*

*means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle,* wherein the arm of each said wheel support member is disposed above said support beam to thereby locate said arms in said vehicle lifting position spaced from the surface supporting said vehicle.

7. [The apparatus of claim 1] *An apparatus for use in lifting and towing a vehicle, comprising:*

*a support beam positionable below said vehicle;*

*two wheel support members, each having an elongated arm and a wheel retainer; and*

*means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle,* wherein said mounting means includes two elongated collars pivotally connected to the oppsoing end portions of the support beam, each collar tapering from the forward end to the rear end and wherein said arms of said wheel support members are slidably engageable and vertically movable within said collars.

8. An apparatus for use in lifting and towing a vehicle, comprising:

a support beam;

two wheel support members, each having an elongated arm and a wheel retainer;

means for mounting said wheel support members to opposing end portions of said support beam such that said arms are in a generally horizontal orientation and for rotating said wheel support members generally horizontally from a laterally remote position spaced outwardly from the sides of the vehicle to a vehicle lifting position immediately adjacent to the outer sides of a pair of wheels on said vehicle; and means for permitting vertical movement of said wheel support members *relative to said support beam while at least partially received within said mounting means* to facilitate location of said wheel support members in said vehicle lifting position.

*15. An apparatus for use in lifting and towing a vehicle, comprising:*

*a support beam positionable below said vehicle;* two wheel support members, each having an elongated arm and a wheel retainer;

means for mounting said wheel support members to opposing end portions of said support beam such that said arms are in a generally horizontal orientation and for generally horizontally rotating said wheel support members from a laterally remote position spaced outwardly from the sides of the vehicle to a vehicle lifting position immediately adjacent to the outer sides of a pair of wheels on said vehicle; and said mounting means including two collars pivotally connected to the end portions of said support beam and configured to permit slidable forward and rearward movement of the wheel support members relative to said support beam.

16. The apparatus of claim 15, further comprising a pair of locking pins, each extending upwardly into each of said two collars and adapted to engage one of a plurality of apertures in the arm of each of said wheel support members mounted within each of said two collars.

17. The apparatus of claim 15, wherein the wheel retainer of each said wheel support member comprises an elongated plate.

18. An apparatus for use in lifting and towing a vehicle, comprising:

a support beam positionable below said vehicle;

two wheel support members, each having an elongated arm and a wheel retainer;

means for mounting said wheel support members to opposing end portions of said support beam such that said arms are in a generally horizontal orientation and for generally horizontally rotating said wheel support members from a lateraly remote position spaced outwardly from the sides of the vehicle to a vehicle lifting position immediately adjacent to the outer sides of a pair of wheels on said vehicle; and said mounting means including two collars connected to the end portions of said support beam and configured to permit the wheel support members to move forwardly, rearwardly and vertically relative to said support beam while at least partially received within said collars.

19. The apparatus of claim 18, further comprising a pair of locking pins, each extending upwardly into each of said two collars and adapted to engage one of a plurality of apertures in the arm of each of said wheel support members mounted within each of said two collars.

20. An apparatus for use in lifting and towing a vehicle, comprising:

a support beam positionable below said vehicle;

two wheel support members, each having an elongated arm and a wheel retainer;

means for mounting said wheel support members to opposing end portions of said support beam such that said arms are in a generally horizontal orienttion and for generally horizontally rotating said wheel support members from a laterally remote positon spaced outwardly from the sides of the vehicle to a vehicle lifting position immediately adjacent to the outer sides of a pair of wheels on said vehicle; and said mounting means including two collars connected to the end portions of said support beam at an elevated position relative to said support beam and configured to permit the wheel support members to move forwardly, rearwardly and vertically relative to said support beam while at least partially received within said collars.

21. The apparatus of claim 20, wherein said wheel retainer of each wheel support member comprises an elongated curved plate.

22. The apparatus of claim 20, wherein said collars are transversely adjustable along said support beam.

* * * * *